US010550708B2

(12) United States Patent
Paulino et al.

(10) Patent No.: US 10,550,708 B2
(45) Date of Patent: Feb. 4, 2020

(54) FLOATING, NON-CONTACT SEAL WITH AT LEAST THREE BEAMS

(71) Applicant: United Technologies Corporation, Farmington, CT (US)

(72) Inventors: Jose R. Paulino, Saco, ME (US); Conway Chuong, Manchester, CT (US); Joey Wong, Enfield, CT (US); Christopher J. Peters, West Hartford, CT (US); Ross Wilson, South Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 527 days.

(21) Appl. No.: 15/252,942

(22) Filed: Aug. 31, 2016

(65) Prior Publication Data

US 2018/0058239 A1    Mar. 1, 2018

(51) Int. Cl.
| | |
|---|---|
| *F01D 11/02* | (2006.01) |
| *F01D 5/02* | (2006.01) |
| *F01D 25/24* | (2006.01) |
| *F04D 29/053* | (2006.01) |
| *F04D 29/08* | (2006.01) |
| *F04D 29/32* | (2006.01) |
| *F04D 29/52* | (2006.01) |

(52) U.S. Cl.
CPC ............. *F01D 11/025* (2013.01); *F01D 5/02* (2013.01); *F01D 25/24* (2013.01); *F04D 29/053* (2013.01); *F04D 29/083* (2013.01); *F04D 29/321* (2013.01); *F04D 29/522* (2013.01); *F05D 2220/32* (2013.01); *F05D 2240/60* (2013.01)

(58) Field of Classification Search
CPC .......... F01D 11/025; F01D 5/02; F01D 25/24; F01D 11/02; F04D 29/053; F04D 29/083; F04D 29/321; F04D 29/522; F04D 29/08; F16J 15/442; F16J 15/445; F05D 2220/32; F05D 2240/60; F05D 2260/38; F05D 2240/55
USPC ............................................ 415/173.5, 173.7
See application file for complete search history.

(56) References Cited

U.S. PATENT DOCUMENTS

| | | | |
|---|---|---|---|
| 3,144,710 A | 8/1964 | Hollander | |
| 3,514,112 A | 5/1970 | Pettengill | |
| (Continued) | | | |

OTHER PUBLICATIONS

EP search report for EP17178170.1 dated Jan. 12, 2018.
(Continued)

*Primary Examiner* — Dwayne J White
*Assistant Examiner* — Jackson N Gillenwaters
(74) *Attorney, Agent, or Firm* — O'Shea Getz P.C.

(57) ABSTRACT

Aspects of the disclosure are directed to a floating, non-contact seal comprising: a shoe, and at least three beams, each beam having a first axial end and a second axial end, where the first axial ends are coupled to the shoe and the second axial ends are coupled to a ring structure. Aspects of the disclosure are directed to an engine comprising: a first structure, a second structure configured to rotate relative to the first structure, and a floating, non-contact seal that interfaces the first structure and the second structure, where the seal includes: a shoe, and at least three beams, where each beam has a first axial end and a second axial end, where the first axial ends are coupled to the shoe and the second axial ends are coupled to a ring structure.

11 Claims, 5 Drawing Sheets

(56) References Cited

U.S. PATENT DOCUMENTS

| | | |
|---|---|---|
| 4,363,599 A | 12/1982 | Cline |
| 4,872,812 A | 10/1989 | Hendley |
| 5,127,793 A | 7/1992 | Walker |
| 7,896,352 B2 | 3/2011 | Justak |
| 8,002,285 B2 | 8/2011 | Justak |
| 8,126,628 B2 | 2/2012 | Hershey |
| 8,172,232 B2 | 5/2012 | Justak |
| 8,474,827 B2* | 7/2013 | Grondahl ............... F01D 11/02 277/411 |
| 8,505,411 B2 | 8/2013 | Justak |
| 8,641,045 B2 | 2/2014 | Justak |
| 8,919,781 B2 | 12/2014 | Justak |
| 9,016,692 B2 | 4/2015 | Haubold |
| 2004/0060372 A1* | 4/2004 | Hopkins ............... G01L 1/2243 73/862.637 |
| 2008/0265513 A1 | 10/2008 | Justak |
| 2012/0193875 A1* | 8/2012 | Deo ............... F01D 11/003 277/412 |
| 2015/0192028 A1 | 7/2015 | Gieg |
| 2015/0308281 A1* | 10/2015 | Strock ............... C23C 4/10 415/173.4 |
| 2016/0003085 A1 | 1/2016 | Roberge |
| 2016/0108750 A1* | 4/2016 | Wilson ............... F01D 11/00 277/411 |
| 2016/0130963 A1 | 5/2016 | Wilson et al. |

OTHER PUBLICATIONS

L.P. Ludwig, "Sealing Technology for Aircraft Gas Turbine Engines", NASA Technical Memorandum X-71607, Presentation Paper for Tenth Propulsion Conference, San Diego, California, Oct. 21-24, 1974.

* cited by examiner

FLOATING, NON-CONTACT SEAL WITH AT LEAST THREE BEAMS

STATEMENT REGARDING FEDERALLY SPONSORED RESEARCH OR DEVELOPMENT

This invention was made with government support under contract number FA8650-09-D-2923-0021 awarded by the United States Air Force. The government has certain rights in the invention.

BACKGROUND

Seals are used in aircraft engines to isolate a fluid from one or more areas/regions of the engine. For example, seals control various parameters (e.g., temperature, pressure) within the areas/regions of the engine and ensure proper/efficient engine operation and stability.

Referring to FIGS. 2A-2B, a prior art sealing system 200 is shown. The system 200 is used to provide an interface between a static engine structure 206 and a rotating engine structure 212. The system 200 includes a floating, non-contact seal 218 that is formed from beams 230a and 230b and a shoe 236 coupled to the beams 230a and 230b. The seal 218 may interface to the structure 206 via a carrier 242. A spacer 248 may separate the carrier 242 and/or the beams 230a and 230b from a seal cover 254. Secondary seals 260 may be included in a cavity formed between the spacer 248, the cover 254 and the shoe 236. The spacer 248 and/or the seal cover 254 may help to maintain an (axial) position of the secondary seals 260. The shoe 236 may interface to (e.g., may slide or rotate with respect to) a scalloped plate 266. The shoe 236 and the beams 230a and 230b may interface to an outer ring structure 288. The seal 218 may include at least some characteristics that are common with a HALO® seal provided by, e.g., Advanced Technologies Group, Inc. of Stuart, Fla.

In operation, air flows from a high pressure area/region 270 of the engine to a low pressure area/region 280 of the engine as shown via the arrow 284. As the air flows passes teeth 238 of the shoe 236 (where the teeth 238 are frequently formed as thin knife-edges), an associated pressure field changes. This change induces the shoe 236 to move in, e.g., the radial reference direction until an equilibrium condition is obtained. In this respect, the seal 218 is adaptive to changing parameters and allows for maintenance of clearances between the static engine structure 206 and the rotating engine structure 212 within a relatively tight range in order to promote engine performance/efficiency. The secondary seals 260 may promote the flow 284 from the high pressure region 270 to the low pressure region 280 as shown between the shoe 236 (e.g., teeth 238) and the rotating structure 212.

In order to accommodate the movement of the shoe 236 described above, the beams 230a and 230b must meet certain structural criteria. On one hand, the beams 230a and 230b must satisfy the natural frequency limit of the rotating structure 212 and must usually be stiffer than a specified threshold, thereby causing the beams 230a and 230b to have a (radial) thickness that is greater than a first (e.g., minimum) threshold. On the other hand, the beams 230a and 230b must be compliant enough to avoid over-stressing them (frequently referred to as having a low cycle fatigue (LCF)) during relative movements/deflections between the structures 206 and 212, thereby causing the beams 230a and 230b to have a (radial) thickness that is less than a second (e.g., maximum) threshold. In many instances, it is difficult to simultaneously satisfy these two competing criteria.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a floating, non-contact seal comprising: a shoe, and at least three beams, each beam having a first axial end and a second axial end, where the first axial ends are coupled to the shoe and the second axial ends are coupled to a ring structure. In some embodiments, the at least three beams consist of three beams. In some embodiments, the seal comprises more than three beams.

Aspects of the disclosure are directed to an engine comprising: a first structure, a second structure configured to rotate relative to the first structure, and a floating, non-contact seal that interfaces the first structure and the second structure, where the seal includes: a shoe, and at least three beams, where each beam has a first axial end and a second axial end, where the first axial ends are coupled to the shoe and the second axial ends are coupled to a ring structure. In some embodiments, a first of the beams is located radially outward of a second of the beams and a third of the beams with respect to an axial centerline of the engine, and the second of the beams is located radially outward of the third of the beams with respect to the axial centerline of the engine. In some embodiments, the first structure is an engine case. In some embodiments, the second structure includes at least one of a shaft or a rotor disk. In some embodiments, the first and second structures are part of a compressor section of the engine. In some embodiments, the first and second structures are part of a turbine section of the engine. In some embodiments, the seal interfaces a first region of the engine to a second region of the engine in terms of an airflow from the first region of the engine to the second region of the engine. In some embodiments, the shoe comprises a plurality of teeth, and the airflow substantially flows in an axial direction relative to a centerline of the engine, radially between the teeth and the second structure. In some embodiments, the teeth are located radially outward of the second structure with respect to an axial centerline of the engine. In some embodiments, the ring structure is located radially outward of the shoe with respect to an axial centerline of the engine.

BRIEF DESCRIPTION OF THE DRAWINGS

The present disclosure is illustrated by way of example and not limited in the accompanying figures in which like reference numerals indicate similar elements. The drawing figures are not necessarily drawn to scale unless specifically indicated otherwise.

DETAILED DESCRIPTION

Figure 1:
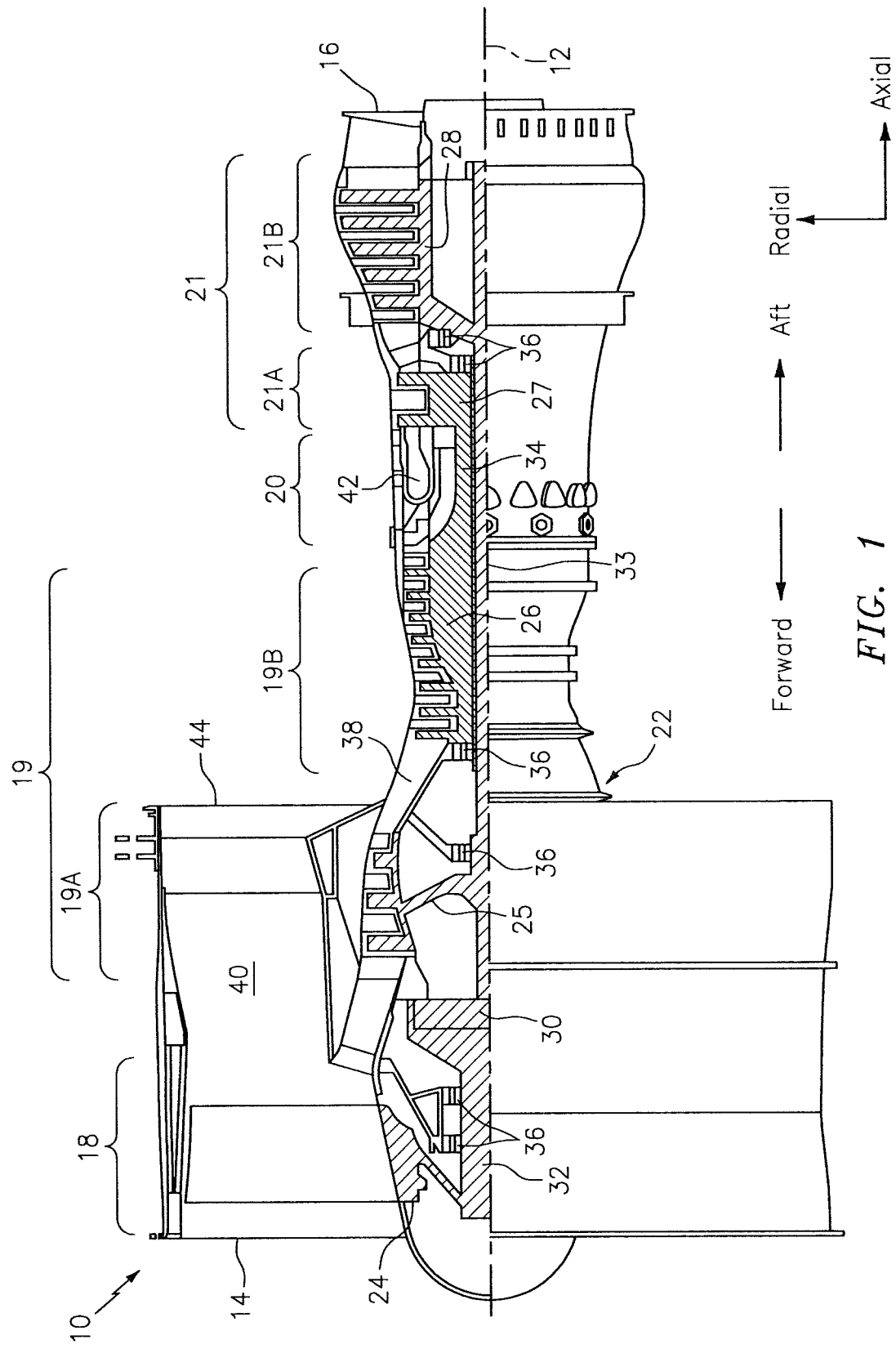
FIG. 1 is a side cutaway illustration of a geared turbine engine.
Figure 2A:
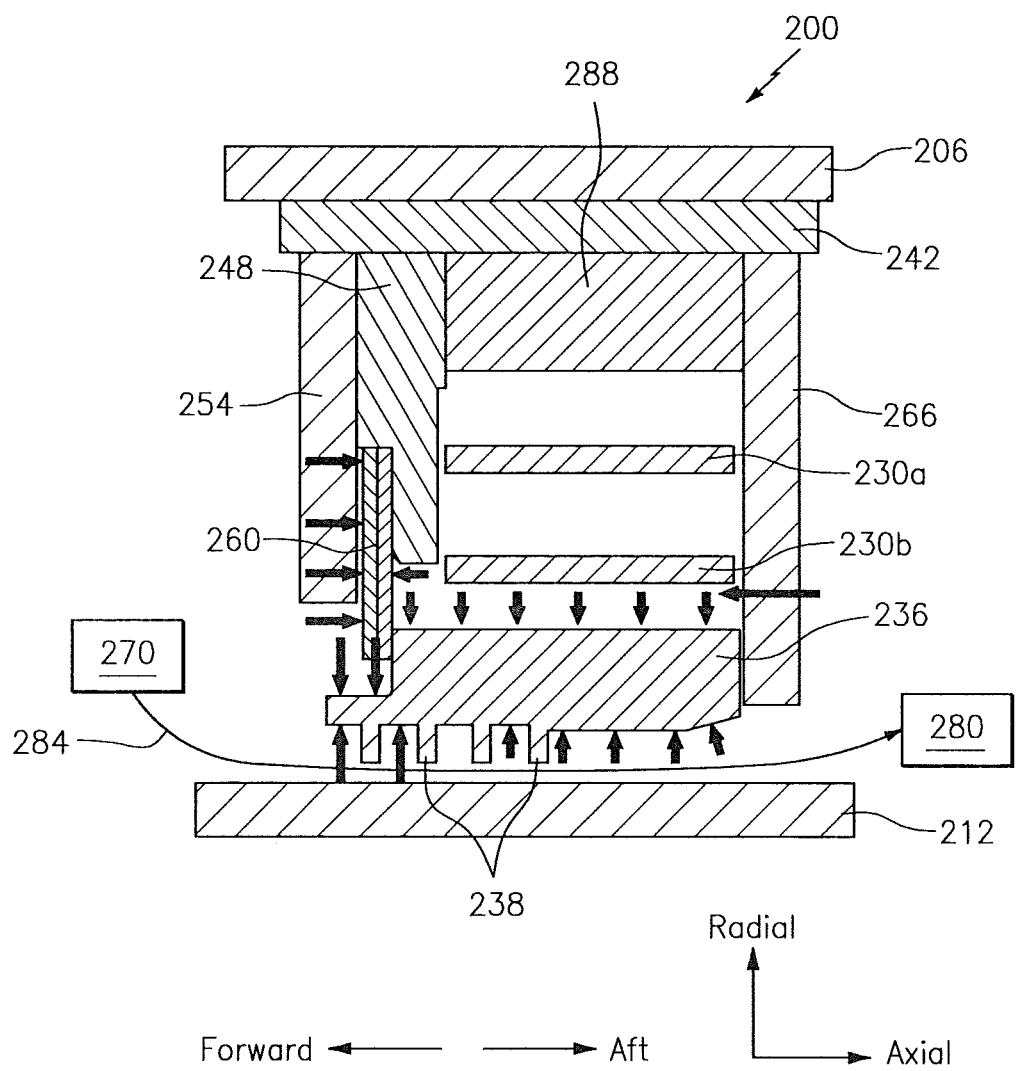
FIG. 2A illustrates a prior art sealing system.
Figure 2B:
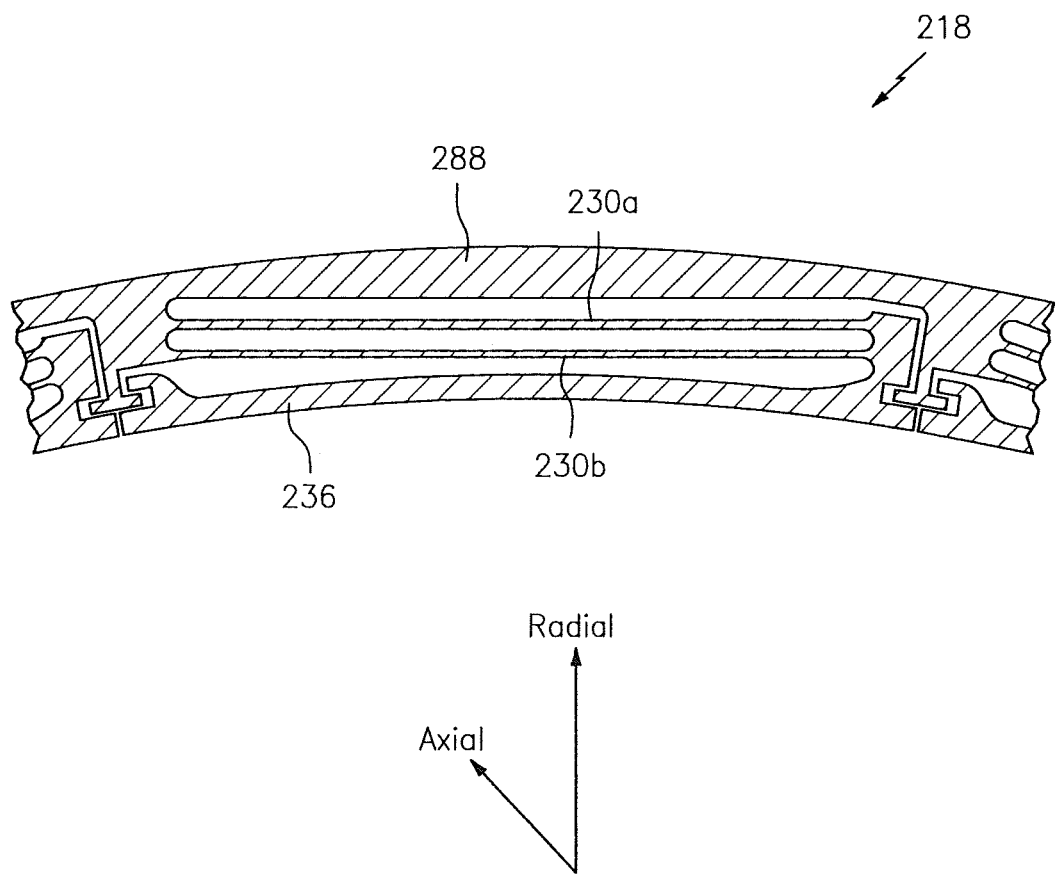
FIG. 2B illustrates a prior art seal of the system of FIG. 2A.

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities or a space/gap between the entities that are being coupled to one another.

In accordance with various aspects of the disclosure, apparatuses, systems, and methods are described for increasing an overall stiffness associated with a sealing system environment relative to conventional sealing system environments. Such an increase in stiffness may be obtained without also increasing the stress in each of the individual beams of a seal. In some embodiments, a seal may incorporate at least three beams and possibly even more beams.

Aspects of the disclosure may be applied in connection with a gas turbine engine. FIG. 1 is a side cutaway illustration of a geared turbine engine 10. This turbine engine 10 extends along an axial centerline 12 between an upstream airflow inlet 14 and a downstream airflow exhaust 16. The turbine engine 10 includes a fan section 18, a compressor section 19, a combustor section 20 and a turbine section 21. The compressor section 19 includes a low pressure compressor (LPC) section 19A and a high pressure compressor (HPC) section 19B. The turbine section 21 includes a high pressure turbine (HPT) section 21A and a low pressure turbine (LPT) section 21B.

The engine sections 18-21 are arranged sequentially along the centerline 12 within an engine housing 22. Each of the engine sections 18-19B, 21A and 21B includes a respective rotor 24-28. Each of these rotors 24-28 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 24 is connected to a gear train 30, for example, through a fan shaft 32. The gear train 30 and the LPC rotor 25 are connected to and driven by the LPT rotor 28 through a low speed shaft 33. The HPC rotor 26 is connected to and driven by the HPT rotor 27 through a high speed shaft 34. The shafts 32-34 are rotatably supported by a plurality of bearings 36; e.g., rolling element and/or thrust bearings. Each of these bearings 36 is connected to the engine housing 22 by at least one stationary structure such as, for example, an annular support strut.

During operation, air enters the turbine engine 10 through the airflow inlet 14, and is directed through the fan section 18 and into a core gas path 38 and a bypass gas path 40. The air within the core gas path 38 may be referred to as "core air". The air within the bypass gas path 40 may be referred to as "bypass air". The core air is directed through the engine sections 19-21, and exits the turbine engine 10 through the airflow exhaust 16 to provide forward engine thrust. Within the combustor section 20, fuel is injected into a combustion chamber 42 and mixed with compressed core air. This fuel-core air mixture is ignited to power the turbine engine 10. The bypass air is directed through the bypass gas path 40 and out of the turbine engine 10 through a bypass nozzle 44 to provide additional forward engine thrust. This additional forward engine thrust may account for a majority (e.g., more than 70 percent) of total engine thrust. Alternatively, at least some of the bypass air may be directed out of the turbine engine 10 through a thrust reverser to provide reverse engine thrust.

FIG. 1 represents one possible configuration for an engine 10. Aspects of the disclosure may be applied in connection with other environments, including additional configurations for gas turbine engines. Aspects of the disclosure may be applied in connection with non-geared engines.

Figure 3A:
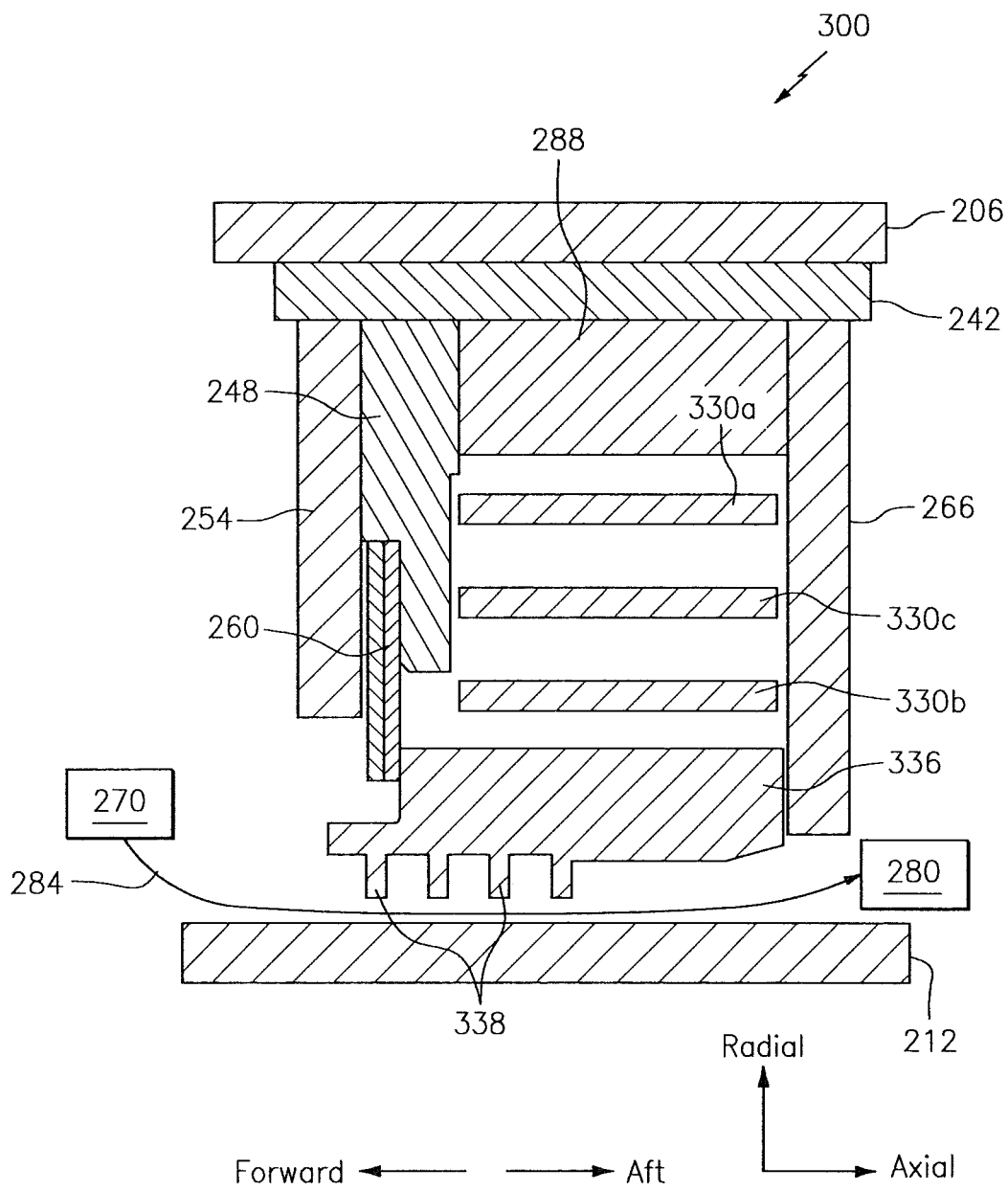
FIG. 3A illustrates a sealing system in accordance with aspects of this disclosure.
Figure 3B:
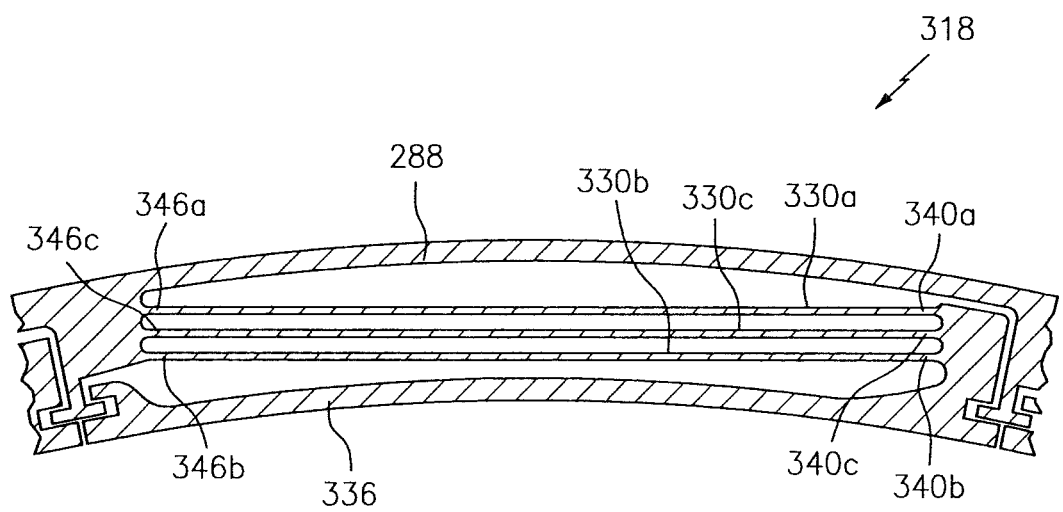
FIG. 3B illustrates a seal of the system of FIG. 3A.
Figure 3B:
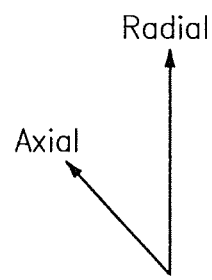

Referring now to FIG. 3A-3B, a sealing system environment 300 is shown. The system 300 may be incorporated as part of one or more sections of an engine, such as for example, the compressor section 19 or the turbine section 21 of the engine 10 (see FIG. 1). The system 300 includes many of the same components of the system 200 described above, and so, a complete re-description of the components that are in common is omitted for the sake of brevity.

In terms of differences between the system 200 and the system 300, the system 300 is shown in FIGS. 3A-3B as including a seal 318. The seal 318 may include a shoe 336 (with teeth 338) that couples to beams 330a, 330b, and 330c. Thus, the seal 318 may include at least three beams (e.g., beams 330a-330c, where the beam 330a may be radially outward of the beam 330c and the beam 330c may be radially outward of the beam 330b). The particular count of beams that may be included may be based on the (radial) space that is available; more than three beams may be included in some embodiments.

In some embodiments, a first of the beams 330a, 330b, and 330c (e.g., the beam 330a) may correspond to the beam 230a and a second of the beams 330a, 330b, and 330c (e.g., the beam 330b) may correspond to the beam 230b. In some embodiments, each of the beams 330a-330c may be different from the beams 230a and 230b; for example, each of the beams 330a-330c may have a different profile (e.g., a different radial thickness) relative to each of the beams 230a and 230b. The radial gap between the ring structure 288 and the shoe 336 may be the same as, or different from, the radial gap between the ring structure 288 and the shoe 236.

As shown in FIG. 3B, the beams 330a-330c may include first (axial) ends 340a-340c, respectively. The beams 330a-330c may include second (axial) ends 346a-346c, respectively. The first ends 340a-340c may couple to the shoe 336. The second ends 346a-346c may couple to the ring structure 288.

Technical effects and benefits of this disclosure include a seal and associated sealing system environment that has at least three beams. The use of at least three beams may increase a stiffness of the seal system without increase to the stress in the beams. Stated slightly differently, each of the beams of an at-least-three-beam seal may react/behave in substantially the same manner as a system incorporating only two beams in terms of beam flexibility/compliance; however, the overall stiffness of the system may increase from the perspective of the operational frequencies associated with an engine. In this respect, stiffness and LCF requirements associated with an engine may be more readily/easily satisfied by virtue of using a seal having at least three beams. Moreover, the travel of the shoe may be substantially the same as between a seal having two beams and a seal having three or more beams. For example, the shoe may only be able to travel in a radial reference direction; the shoe may be prevented from (substantially) moving in an axial or circumferential reference direction with respect to an engine centerline. Still further, the use of at least three beams may promote reliability in the sense that if one of the beams becomes inoperable the other beams may enable the seal to continue to operate/function.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure. One or more features described in connection with a first embodiment may be combined with one or more features of one or more additional embodiments.

What is claimed is:

1. A floating, non-contact seal comprising:
   a shoe; and
   at least three beams, each beam having a first axial end and a second axial end, where the first axial ends are coupled to the shoe and the second axial ends are coupled to a ring structure, and where a first of the beams is located radially outward of a second of the beams and a third of the beams with respect to an axial centerline of the engine, and wherein the second of the beams is located radially outward of the third of the beams with respect to the axial centerline of the engine.

2. The floating, non-contact seal of claim 1, wherein the at least three beams consist of three beams.

3. An engine comprising:
   a first structure;
   a second structure configured to rotate relative to the first structure; and
   a floating, non-contact seal that interfaces the first structure and the second structure, wherein the seal includes:
   a shoe; and
   at least three beams,
   wherein each beam has a first axial end and a second axial end, where the first axial ends are coupled to the shoe and the second axial ends are coupled to a ring structure,
   wherein a first of the beams is located radially outward of a second of the beams and a third of the beams with respect to an axial centerline of the engine, and wherein the second of the beams is located radially outward of the third of the beams with respect to the axial centerline of the engine.

4. The engine of claim 3, wherein the first structure is an engine case.

5. The engine of claim 3, wherein the second structure includes at least one of a shaft or a rotor disk.

6. The engine of claim 3, wherein the first and second structures are part of a compressor section of the engine.

7. The engine of claim 3, wherein the first and second structures are part of a turbine section of the engine.

8. The engine of claim 3, wherein the seal interfaces a first region of the engine to a second region of the engine in terms of an airflow from the first region of the engine to the second region of the engine.

9. The engine of claim 8, wherein the shoe comprises a plurality of teeth, and wherein the airflow substantially flows in an axial direction relative to a centerline of the engine, radially between the teeth and the second structure.

10. The engine of claim 9, wherein the teeth are located radially outward of the second structure with respect to an axial centerline of the engine.

11. The engine of claim 3, wherein the ring structure is located radially outward of the shoe with respect to an axial centerline of the engine.

* * * * *